350-333

XR 3,976,362

United States Patent [19]

Kawakami

[11] 3,976,362

[45] Aug. 24, 1976

[54] METHOD OF DRIVING LIQUID CRYSTAL MATRIX DISPLAY DEVICE

[75] Inventor: Hideaki Kawakami, Hitachi, Japan

[73] Assignee: Hitachi, Ltd., Japan

[22] Filed: Oct. 15, 1974

[21] Appl. No.: 514,992

[30] Foreign Application Priority Data

Oct. 19, 1973 Japan .............................. 48-116888

[52] U.S. Cl. ...................... 350/160 LC; 340/324 M

[51] Int. Cl.² .......................................... G02F 1/13

[58] Field of Search .......... 350/160 LC; 340/324 M; 315/169 TV

[56] References Cited

UNITED STATES PATENTS 3,776,615 12/1973 Tsukamoto et al. ........... 340/324 M

OTHER PUBLICATIONS

Gooch et al., "Matrix-Addressed Liquid Crystal Displays" J. Phys. D: Appl. Phys. (G.B.) vol. 5, 1972, pp. 1218–1225.

*Primary Examiner*—John K. Corbin
*Assistant Examiner*—Wm. H. Punter
*Attorney, Agent, or Firm*—Craig & Antonelli

[57] ABSTRACT

In a method of driving with a one-line-at-a-time scanning system a liquid crystal matrix display device in which the picture elements are defined by liquid crystal cell portions formed between the scanning and the signal electrodes arranged in the form of a matrix, the amplitude of the voltage applied to non-selected cells along a selected scanning electrode is made different from the amplitude of the voltage applied to non-selected cells along a selected signal electrode; the amplitude of the voltage (bias voltage) applied to non-selected cells along the selected signal electrode is made equal to the amplitude of the voltage applied to the remaining non-selected cells; and the bias voltage is determined depending on the number of the scanning electrodes, so that the operation margin is further improved.

4 Claims, 14 Drawing Figures

(B) : SELECTED STATE
(A),(C) : HALF-SELECTED STATE
(D) : NON-SELECTED STATE (B) : SELECTED STATE
(A),(C) : HALF-SELECTED STATE
(D) : NON-SELECTED STATE

METHOD OF DRIVING LIQUID CRYSTAL MATRIX DISPLAY DEVICE

The present invention relates to a method of driving a liquid crystal matrix display device with a one-line-at-a-time scanning system.

The main object of the present invention is to provide a method of stably driving a liquid crystal matrix display device at the maximum operation corresponding to the number of scanning electrodes.

An additional object of the present invention is to provide a method of stably driving a liquid crystal matrix display device having more than 50 scanning electrodes.

To attain the above-mentioned objects, according to the present invention there is provided a method of driving with a one-line-at-a-time scanning system a liquid crystal matrix display device in which the picture elements are defined by liquid crystal cell portions formed between the scanning and the signal electrodes arranged in the form of a matrix, characterized in that the amplitude of the voltage applied to non-selected cells along a selected scanning electrode is made different from the amplitude of the voltage applied to non-selected cells along a selected signal electrode and the amplitude of the voltage applied to non-selected cells along the selected signal electrode is made equal to the amplitude of the voltage applied to the remaining non-selected cells.

A more detailed aspect of the present invention is the above-mentioned method characterized in that in the case where the amplitude of the voltage at the selected cell is $V_o$, the amplitude of the voltage at the non-selected cells along a selected scanning electrode is chosen to be $(1/b)V_o$ and the amplitude of the voltage at the non-selected cells along a selected signal electrode and at the remaining non-selected cells to be $(1/a)V_o$, and that the relationship between the constants $a$ and $b$ is such that $a \neq b$ and $(a/b)^2 = (a-2)^2$.

Now, the present invention will be described in detail by way of embodiment with reference to the attached drawings, in which:

FIGS. 1A amd 1B show schematically a structure of a liquid crystal matrix display device according to the prior art;

FIG. 2 schematically shows a liquid crystal matrix display device with its associated peripheral circuits;

The principle of the liquid crystal display can be typified by two modes: Dynamic Scattering Mode (DSM) and Field Effect Mode (FEM). The present invention is applicable to both DSM and FEM but for brevity of description it is described below as applied to the DSM alone.

Liquid crystal matrix display devices are usually classified into two groups: transmission type and reflection type.

Figure 1A:
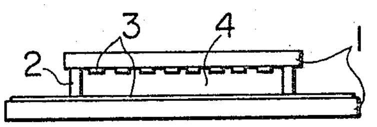
Figure 1B:
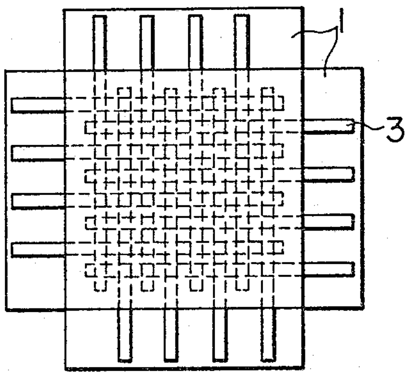

FIGS. 1A and 1B show a conventional liquid crystal matrix display device of transmission type, FIG. 1A and FIG. 1B respectively showing a side view and a plan view. In the figures, two glass plates 1, each having a thickness of several millimeters and being provided on one of its principal surfaces with the stripes of transparent, conductive film (Nesa film) 3, are superposed one upon the other in such a manner that the stripes of one glass plate are perpendicular to those of the other glass plate while those principal surfaces of the glass plates which carry thereon the stripes of the film 3 are faced with each other. Between the two superposed glass plates 1 is inserted an insulating spacer 2 having a thickness of several to several tens of microns. And the space defined by the plates 1 and the spacer 2 is filled with liquid crystal material 4. With this structure, the stripes of Nesa film 3 on both the glass plates 1 form a matrix so that each cross point of any two perpendicular stripes of Nesa film 3 serves as a picture element. If a voltage applied between two arbitrarily selected, perpendicular stripes is below a certain level, then that part of the liquid crystal cell which corresponds to the picture element defined as between the two stripes is transparent. On the other hand, if the voltage exceeds the level, the part of the liquid crystal cell becomes opaque due to the Dynamic Scattering phenomenon. The above mentioned level of voltage is usually termed a "threshold voltage". The liquid crystal matrix display device shown in FIG. 1 is indicated generally, for simplification, at numeral 5 in FIG. 2.

Figure 2:
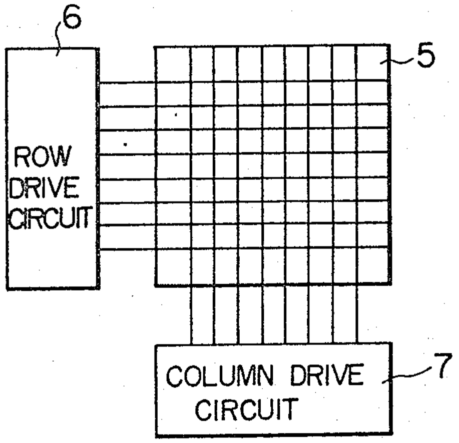

The drive circuit for such a liquid crystal matrix display device 5 consists of a row drive circuit 6 and a column drive circuit 7, as shown in FIG. 2.

For the scanning of this liquid crystal matrix display device is used the one-line-at-a-time scanning system according to the response time of the liquid crystal cell.

Figure 3:
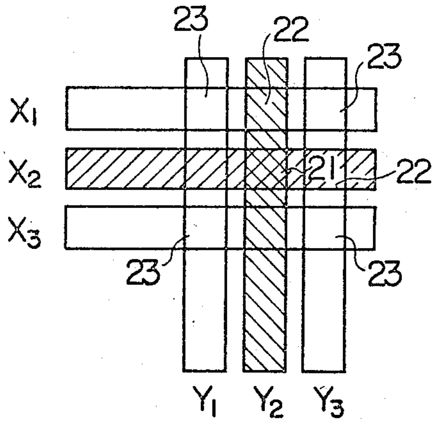
FIG. 3 illustrates the principle of the present invention.

FIG. 3 shows a state of the display device at a certain time; $X_1$, $X_2$ and $X_3$ indicating row electrodes and $Y_1$, $Y_2$ and $Y_3$ column electrodes. The row electrodes $X_1$, $X_2$ and $X_3$ are selected in scanning respectively in this order mentioned. Picture signals are applied to the column electrodes $Y_1$, $Y_2$ and $Y_3$. In FIG. 3, there is seen a case where the electrodes $X_2$ and $Y_2$ are selected, hatched for identification. Though only one column electrode $Y_2$ is selected in FIG. 3 for the sake of simplicity, a plurality of column electrodes may be simultaneously selected in accordance with the picture to be displayed. Here, some definitions should be introduced: the cross point or picture element 21 between two selected electrodes, i.e. $X_2$ and $Y_2$, is called the "selected state"; the cross points, e.g. points indicated at 22, between a selected electrode and a non-selected one are called the "half-selected state"; and the cross points, e.g. points indicated at 23, between two non-selected electrodes are called the "non-selected state". The row and column electrodes are also referred to hereafter as scanning and signal electrodes, respectively.

Figure 4:
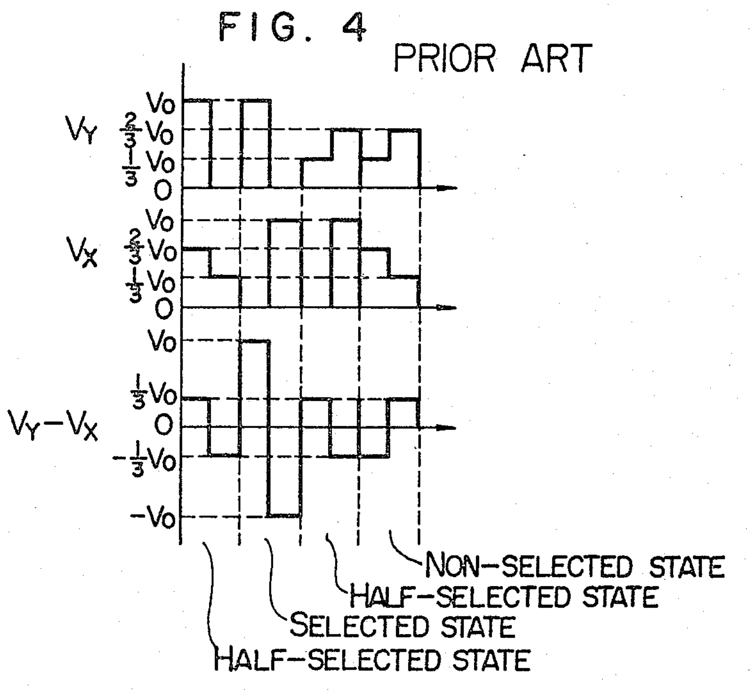
FIG. 4 PRIOR ART
FIG. 4 is a waveform diagram useful for explaining the conventional drive method.

As one of the scanning methods is known the amplitude selective multiplexing method and the 1/3 bias method is preferably used in the prior art. FIG. 4 illustrates the 1/3 bias method. The 1/3 bias method is characterized in that either of the voltages at the half-selected and the non-selected states is one third in amplitude of the voltage at the selected state and that the cross-talk voltage is one third of the selected voltage.

Figure 5:
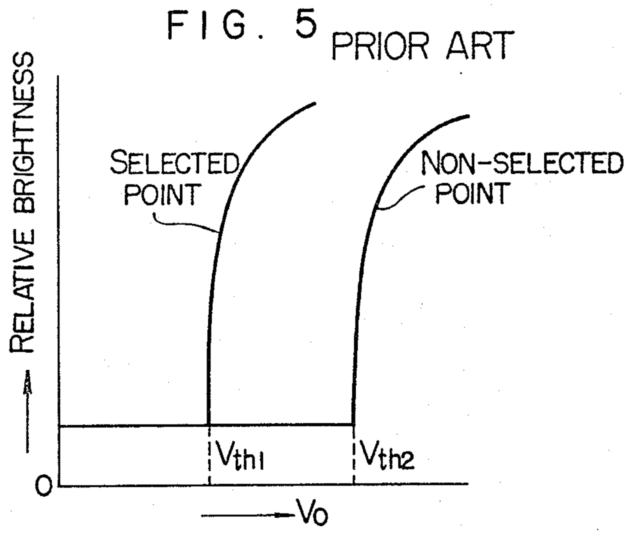
FIG. 5 PRIOR ART
FIG. 5 shows the brightness characteristic according to the amplitude selective multiplexing method.

FIG. 5 shows the relationship between the applied voltages $V_o$ (which is defined by the voltage amplitude applied at the selected state) and the relative brightness at both the selected point (selected picture element) and the non-selected point (non-selected picture element), according to the 1/3 bias method, from which threshold levels $Vth_1$ and $Vth_2$ can be determined. It is seen from FIG. 5 that the dynamic scattering takes place at the selected point when the voltage $V_o$ equals $Vth_1$ and at the non-selected point when $V_o = Vth_2$. Since it is necessary to suppress the dynamic scattering at the non-selected point, the voltage $V_o$ applied at the selected point is chosen to be such that $Vth_1 < V_o < Vth_2$. According to the conventional 1/3 bias method, the voltage $V_o$ is applied to a selected point when a scanning electrode associated with the selected point is scanned, while the voltage $$\frac{V_o}{3}$$

is applied to the selected point when the above-mentioned scanning electrode is not scanned. Accordingly, for a matrix display device having N scanning electrodes, one signal having the amplitude of $V_0$ and (N − 1) signals each having the amplitude of $$\frac{V_o}{3}$$

are successively applied to the selected point during one frame of scanning. Based upon this fact, there is applied to the selected point such an effective voltage as mentioned below, $$V_{S1} = \sqrt{\frac{V_o^2 + \left(\frac{V_o^2}{3}\right)(N-1)}{N}} = \frac{V_o}{3}\sqrt{1 + \frac{8}{N}}$$

On the other hand, N signals each having the amplitude of $$\frac{V_o}{3}$$

are successively applied to any non-selected point. Accordingly, the effective voltage applied to the non-selected point is equal to $$\sqrt{\frac{\left(\frac{V_o}{3}\right)^2 N}{N}}$$

namely $$V_{S2} = \frac{V_o}{3}.$$

It is well known in the art that, in the dynamic scattering mode, the threshold voltage $Vth$ for operating a picture element is determined by the effective voltage applied thereto. Further, as mentioned above, the dynamic scattering takes place at the selected point (picture element) when $V_0 = Vth\ 1$ and at the non-selected point when $V_0 = Vth_2$. Accordingly, in the above-mentioned equations indicating the effective voltage, when the effective voltages $V_{S1}$ and $V_{S2}$ are equal to the threshold voltage, the voltage $V_0$ becomes equal to $Vth\ 1$ and $Vth\ 2$, respectively. Namely, $$V_{S1} = Vth = \frac{Vth\ 1}{3}\sqrt{1 + \frac{8}{N}} \text{ and } V_{S2} = Vth = \frac{Vth\ 2}{3}.$$

From a simple calculation, the threshold levels $Vth_1$ and $Vth_2$ and the operation margin $\alpha$ (defined as a ratio $Vth_2/Vth_1$) which is a measure of the stability of the operation of the display device, are obtained as follows.

$$Vth_1 = 3 \cdot Vth \cdot \sqrt{\frac{N}{N+8}} \quad (1)$$

$$Vth_2 = 3 \cdot Vth \quad (2)$$

$$\alpha = \sqrt{1 + \frac{8}{N}} \quad (3)$$

where $Vth$ is the threshold voltage in the DSM and N the number of the scanning electrodes.

In case where the above described method is applied to a liquid crystal matrix display device, the operation margin $\alpha$ is uniquely determined if the number N of the scanning electrodes is given. Accordingly, the greater is the number N, the smaller is the operation margin, so that according to the conventional method the scanning capacity is limited to no more than several tens of electrodes.

Prior to the detailed description of the present invention by way of embodiment, the principle thereof will be explained.

Figure 6:
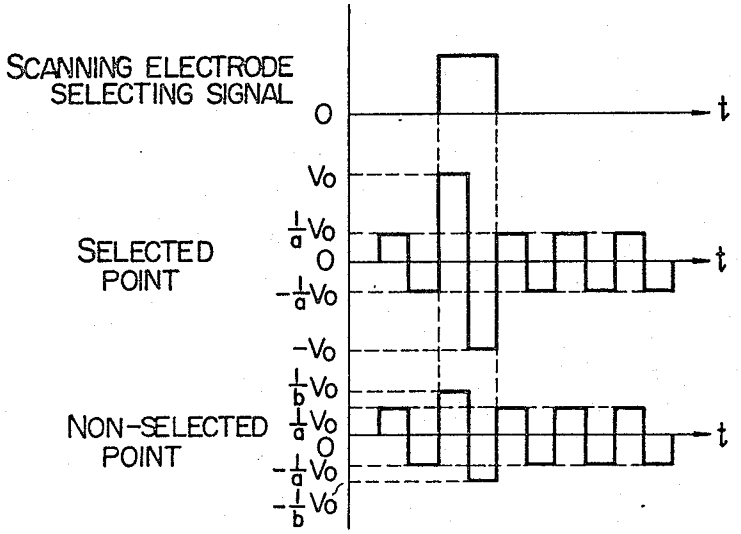
FIG. 6 is a waveform diagram useful for explaining the principle of the present invention.

As shown in FIG. 6, it is assumed that when the scanning electrodes are so selected as shown in FIG. 6, the amplitude of the voltage at each selected state is $V_o$ and the amplitude of the voltage at each half-selected state is $$\frac{1}{b}V_o$$

and that in the other cases the amplitude of the voltage at each half-selected or non-selected state is $$\frac{1}{a}V_o.$$

In this case, the effective voltages $vs_1$ and $vs_2$ respectively at the selected and non-selected points can be determined, if the number of the scanning electrodes is N, by the following formulae and remain constant even if the display pattern is changed.

$$V_{S1} = \sqrt{\frac{(V_o) + \left(\frac{V_o}{a}\right)^2 (N-1)}{N}} \text{ and } V_{S2} = \sqrt{\frac{\left(\frac{V_o}{b}\right)^2 + \left(\frac{V_o}{a}\right)^2 (N-1)}{N}} .$$

namely, $$vs_1 = \frac{1}{a} V_o \sqrt{1 + \frac{a^2 - 1}{N}} \quad (4)$$

$$vs_2 = \frac{1}{a} V_o \sqrt{1 + \frac{a^2/b_2 - 1}{N}} \quad (5)$$

The 1/3 bias method corresponds to a case where a = b = 3 in the formulae (4) and (5).

The threshold levels $Vth_1$ and $Vth_2$ and the operation margin $\alpha$, according to such drive waveforms as shown in FIG. 6 can be obtained in the same manner as in the previously mentioned 1/3 bias method.

$$Vth_1 = a \cdot Vth \sqrt{\frac{N}{N + (a^2 - 1)}} \quad (6)$$

$$Vth_2 = a \cdot Vth \sqrt{\frac{N}{N + (a^2/b^2 - 1)}} \quad (7)$$

$$\alpha = \frac{Vth_2}{Vth_1} = \sqrt{\frac{N + (a^2 - 1)}{N + (a^2/b^2 - 1)}} \quad (8)$$

Figure 7:
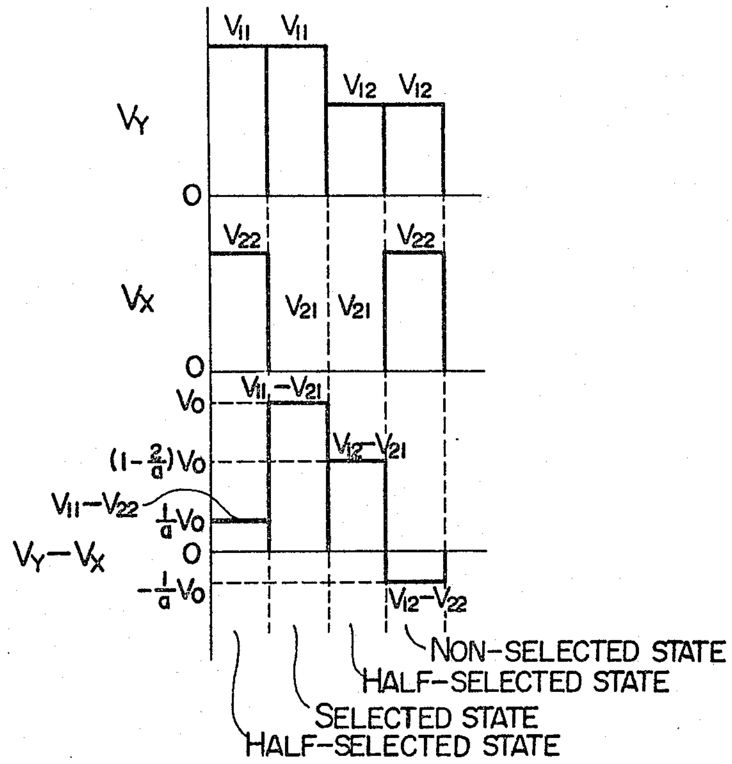
FIG. 7 is a diagram useful for explaining the present invention.

In the waveform diagrams of FIG. 7, it is assumed that the voltages at each Y line (signal electrode) when selected and not selected are respective $V_{11}$ and $V_{12}$ while the voltages at each X line (scanning electrode) when selected and not selected are respectively $V_{21}$ and $V_{22}$. In order to realize the waveforms shown in FIG. 6, the following conditions represented by the formulae (9) to (11) must be satisfied.

$$V_o^2 = (V_{11} - V_{21})^2 \quad (9)$$

$$V_o^2/a^2 = (V_{11} - V_{22})^2 = (V_{12} - V_{22})^2 \quad (10)$$

$$V_o^2/b^2 = (V_{12} - V_{21})^2 \quad (11)$$

From the equation (10), there is obtained $V_{11} = V_{12}$ or $$V_{22} = \frac{V_{11} + V_{12}}{2}.$$

When $V_{11}$ is equal to $V_{12}$, the equation (11) becomes $$\frac{V_o^2}{b^2} = (V_{11} - V_{21})^2.$$

When this equation is combined with the equation (9), $b^2$ becomes equal to 1. This results in a waveform different from that shown in FIG. 7. Accordingly, only the relation $$V_{22} = \frac{V_{11} + V_{12}}{2}$$

may be employed. By substituting this relation into the equation (10), we can obtain $$\frac{V_o^2}{a^2} = \frac{(V_{11} - V_{12})^2}{4}.$$

As is apparent from FIG. 7, $$a > 1 \quad (12)$$

when the above-mentioned equation $$\frac{V_o^2}{a^2} = \frac{(V_{11} - V_{12})^2}{4}$$

is combined with the equation (9) and then compared with the equation (11), the following equation can be obtained, $$\left(\frac{a}{b}\right)^2 = (a-2)^2 \quad (13),$$

and the equation $$\frac{V_o^2}{a^2} = \frac{(V_{11} - V_{12})^2}{4}$$

and the equation (9) have four kinds of combinations, but only two combinations $$\left(\frac{V_o}{a} = \frac{V_{11} - V_{12}}{2}, V_o = V_{11} - V_{21}\right) \text{ and } \left(\frac{-V_o}{a} = \frac{V_{11} - V_{12}}{2}, -V_o = V_{11} - V_{21}\right)$$

give the solutions mentioned below which can satisfy the waveform shown in FIG. 7.

$$\left.\begin{aligned} V_{12} &= V_{11} - \frac{2}{a} V_o \\ V_{21} &= V_{11} - V_o \\ V_{22} &= V_{11} - \frac{1}{a} V_o \end{aligned}\right\} \quad (14)$$

or, $$\left.\begin{aligned} V_{12} &= V_{11} + \frac{2}{a} V_o \\ V_{21} &= V_{11} + V_o \\ V_{22} &= V_{11} + \frac{1}{a} V_o \end{aligned}\right\} \quad (15)$$

In this case, by virtue of the formulae (6), (7) and (13), $Vth_1$, $Vth_2$ and $\alpha$ are as follows.

$$Vth_1 = a \cdot Vth \sqrt{\frac{N}{N + (a^2 - 1)}} \quad (16)$$

$$Vth_2 = a \cdot Vth \sqrt{\frac{N}{N + \{(a-2)^2 - 1\}}} \quad (17)$$

$$\alpha = \sqrt{\frac{N + (a^2 - 1)}{N + \{(a-2)^2 - 1\}}} \quad (18)$$

Figure 8:
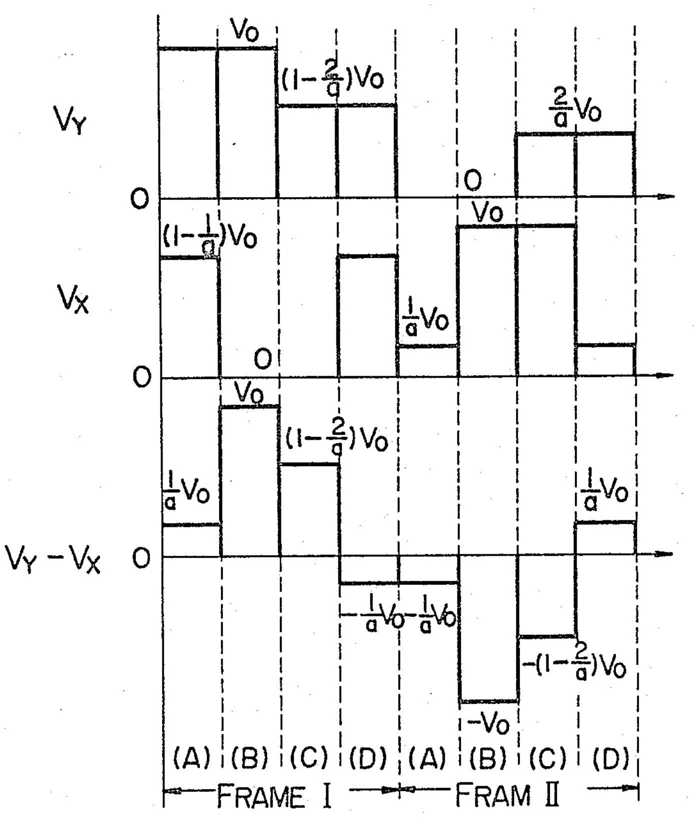
FIG. 8 shows examples of driving waveforms according to the present invention.

Now, if $V_{11}$ is such that $V_{11} = V_o > 0$ and $V_{11} = 0$, the formulae (14) and (15) are respectively transformed into the following expressions (19) and (20) and the associated drive waveforms are as shown in FIG. 8.

$$\text{For } V_{11} = V_o,\quad \left. \begin{aligned} V_{12} &= (1 - \frac{2}{a})V_o \\ V_{21} &= 0 \\ V_{22} &= (1 - \frac{1}{a})V_o \end{aligned} \right\} \quad (19)$$

and for $V_{11} = 0$, $$\left. \begin{aligned} V_{12} &= \frac{2}{a}V_o \\ V_{21} &= V_o \\ V_{22} &= \frac{1}{a}V_o \end{aligned} \right\} \quad (20)$$

The operation margin $\alpha$ is a function of the number N of the scanning line (or electrode) and a constant $a$, as seen in the formula (18), and the formula (18) suggests that $\alpha$ takes the maximum value for the value of $a$ given by the following expression (21).

$$a = \sqrt{N} + 1 \quad (21)$$

As apparent from the formula (21), in the case of a large scale liquid crystal display device having 49 scanning lines, the operation margin $\alpha$ takes the maximum for $a = 8$. The conventional 1/3 bias method will here be compared with the case where the optimum condition according to the present invention is taken into account, with $N = 100$. When $a = 3$ (corresponding to the 1/3 bias method), the operation margin $\alpha = \sqrt{1.08}$ while for $a = 11$, $\alpha = \sqrt{1.222}$. This means that the operation margin can be much improved according to the present invention.

Figure 9:
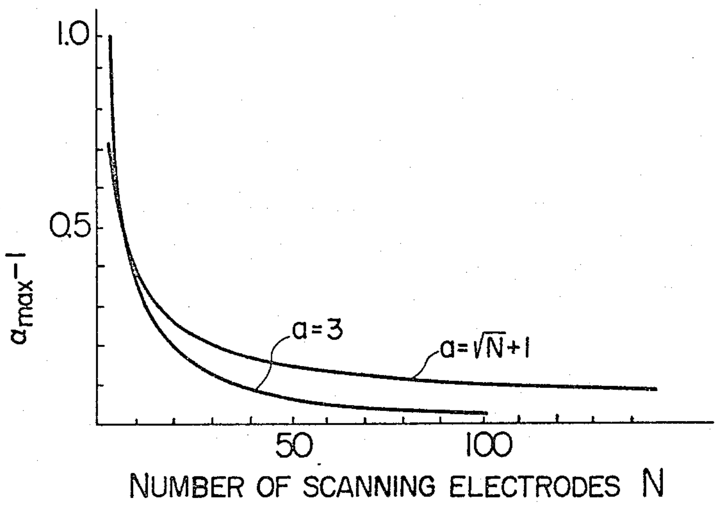
FIG. 9 shows the relationship between the number of scanning lines and the operation margin, according to the present invention.

FIG. 9 shows the relationships between the number N of the scanning electrodes and the operation margin $\alpha$, according to the 1/3 bias method ($a = 3$) and the case ($a = \sqrt{N} + 1$) where the optimum condition is adopted according to the present invention. To be exact, the vertical axis in FIG. 9 represents not the margin $\alpha$ itself but the quantity ($\alpha_{max} - 1$).

Figure 10:
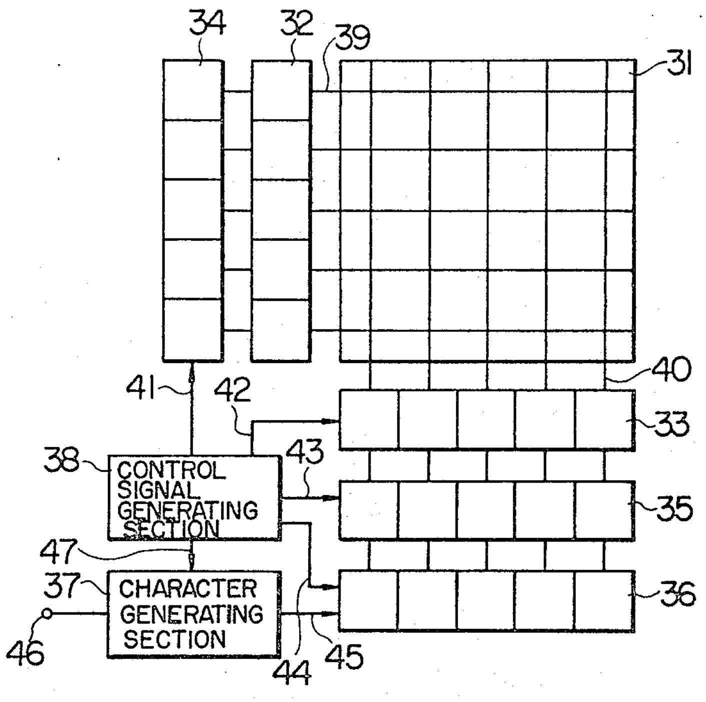
FIG. 10 shows a system of a liquid crystal character display device to which the present invention is applied.

FIG. 10 shows a system consisting of a liquid crystal character display device and its peripheral equipments, to which the present invention is applied. In order to scan a liquid crystal matrix panel 31 in a one-line-at-a-time manner, a scanning signal generating section 34 such as a ring counter delivers a signal to sequentially select scanning electrode drive circuits 32 which drive scanning electrodes 39. On the other hand, a character generating section 37 generates a character decoding signal 45 in response to a character coding signal 46 so that a character signal covering a single row is stored in a buffer memory 36. The content of the buffer memory 36 is sequentially read out and then stored in a line memory 35. A signal electrode drive circuit 33 is selectively operated in accordance with the content of the line memory 35 so that signal electrodes 40 are driven selectively. And all the circuits mentioned above are controlled by a control signal generating section 38. In FIG. 10, numeral 41 indicates a frame signal; 42 a line signal; 43 a line-memory control signal; 44 a buffer-memory control signal; and 47 a character-generating-section control signal.

Figure 11:
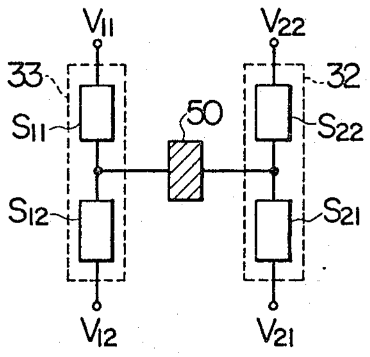
FIG. 11 shows a concrete example of the circuit of a part of the system shown in FIG. 10.

FIG. 11 shows examples of drive circuits used as the scanning electrode drive circuit 32 and the signal electrode drive circuit 33. A switch $S_{21}$ or a switch $S_{22}$ is turned on according as the scanning electrodes are selected or not. On the other hand, a switch $S_{11}$ or a switch $S_{12}$ is turned on according as the signal electrodes are selected or not. Accordingly, such voltages as shown in the diagram of FIG. 7 are applied to the liquid crystal cell 50 of the liquid crystal matrix panel 31.

Figure 12:
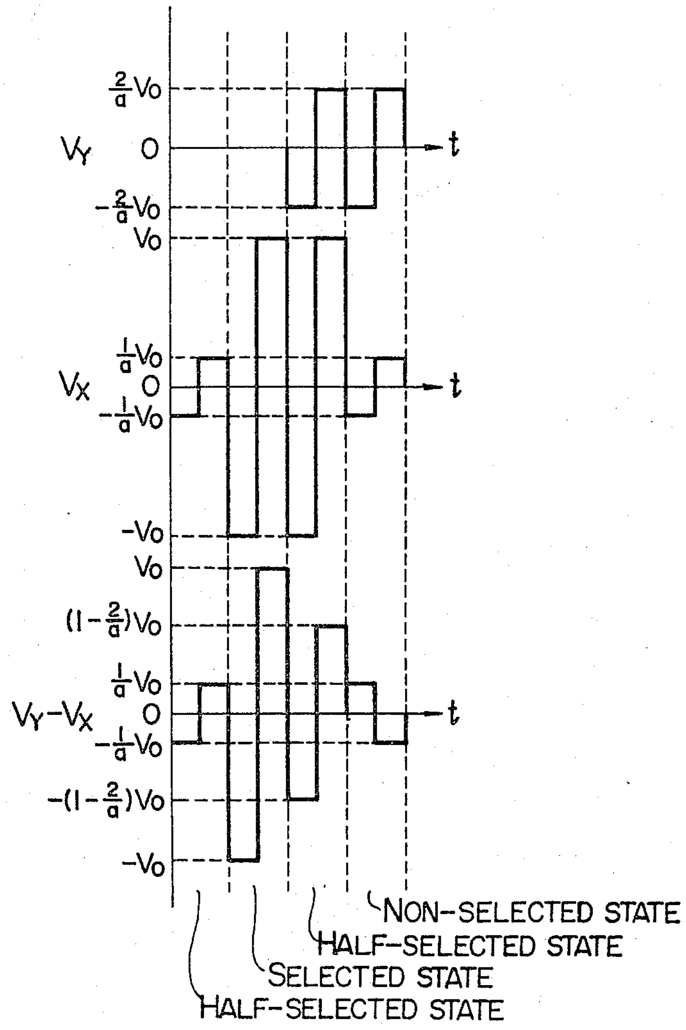
FIGS. 12 and 13 show in the form of diagram the application examples of the invention.
Figure 13:
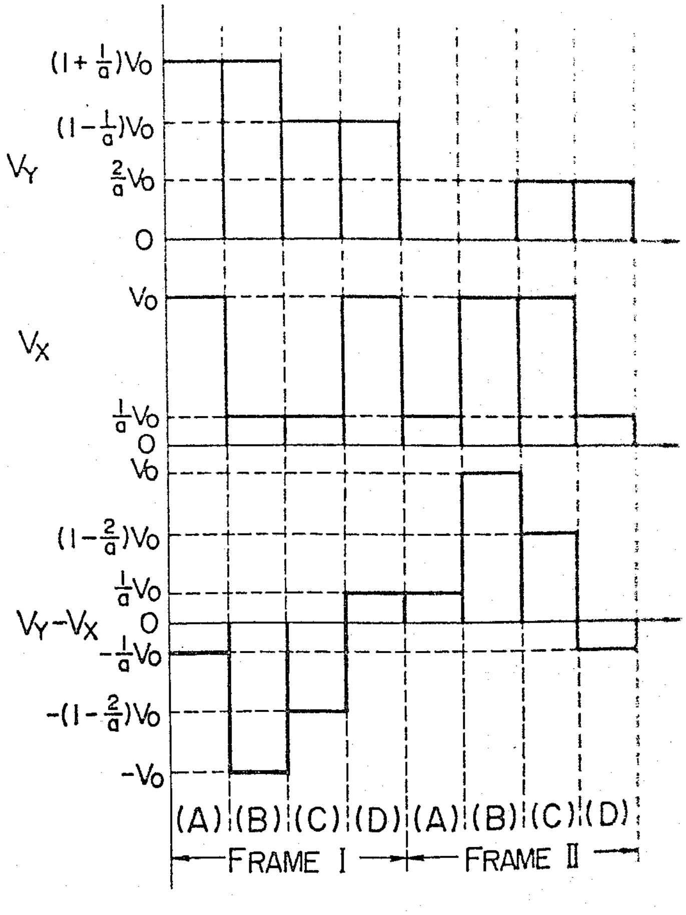

FIGS. 12 and 13 show the drive waveforms obtained respectively when $V_{11} = 0$ and $$V_{11} = (1 + \frac{1}{a})V_o$$

in the formulae (14) and (15).

As described above, according to the present invention, the operation margin can be improved by choosing bias voltages according to the number of scanning electrodes and even a large-capacity liquid crystal matrix display device with more than 50 scanning electrodes can be effectively driven.

What we claim is:

1. A method of driving with a one-line-at-a-time scanning system a liquid crystal matrix display device in which the picture elements are defined by liquid crystal cell portions formed between the scanning and the signal electrodes arranged in the form of a matrix, characterized in that the amplitude of the DC voltage applied to non-selected cells along a selected scanning electrode is made different from the amplitude of the DC voltage applied to non-selected cells along a selected signal electrode and the amplitude of the DC voltage applied to non-selected cells along the selected signal electrode is made equal to the amplitude of the DC voltage applied to the remaining non-selected cells.

2. A method of driving with a one-line-at-a-time scanning system a liquid crystal matrix display device in which the picture elements are defined by liquid crystal cell portions formed between the scanning and the signal electrodes arranged in the form of a matrix, characterized in that the amplitude of the voltage applied to non-selected cells along a selected scanning electrode is made different from the amplitude of the voltage applied to non-selected cells along a selected signal electrode and the amplitude of the voltage applied to non-selected cells along the selected signal electrode is made equal to the amplitude of the voltage applied to the remaining non-selected cells; and in the case where the amplitude of the voltage at the selected cell is $V_o$, the amplitude of the voltage at the non-selected cells along a selected scanning electrode is chosen to be $(1/b)V_o$ and the amplitude of the voltage at the non-selected cells along a selected signal electrode and at the remaining non-selected cells to be $(1/a)V_o$, and that the relationship between the constants $a$ and is such that $a \neq b$ and $(a/b)^2 = (a - 2)^2$

3. A method as claimed in claim 2, characterized in that with $V_{11}$ arbitrarily given, the following relations hold:

$$V_{12} = V_{11} \pm (2/a)V_o,$$

$$V_{21} = V_{11} \pm V_o,$$

and $$V_{22} = V_{11} \pm (1/a)V_0,$$

where $V_{21}$ and $V_{22}$ are the voltages applied to the selected and non-selected scanning electrodes respectively, and $V_{11}$ and $V_{12}$ are the voltages applied to the selected and non-selected signal electrodes respectively.

4. A method as claimed in claim 2, characterized in that the constant a is greater than 3 and made approximately equal to $\sqrt{N}+1$, where $N$ is the number of the scanning electrodes.

* * * * *